United States Patent
Briden et al.

(10) Patent No.: US 12,392,090 B2
(45) Date of Patent: Aug. 19, 2025

(54) PORE REMOVAL FROM SCREEN DEVICES TO INCREASE FLOW UNIFORMITY

(71) Applicant: Peridot Print LLC, Palo Alto, CA (US)

(72) Inventors: John Joseph Briden, Palo Alto, CA (US); Matthew A. Shepherd, Vancouver, WA (US)

(73) Assignee: Peridot Print LLC, Palo Alo (CA)

( * ) Notice: Subject to any disclaimer, the term of this patent is extended or adjusted under 35 U.S.C. 154(b) by 418 days.

(21) Appl. No.: 18/013,463

(22) PCT Filed: Jul. 14, 2020

(86) PCT No.: PCT/US2020/041990
§ 371 (c)(1),
(2) Date: Dec. 28, 2022

(87) PCT Pub. No.: WO2022/015291
PCT Pub. Date: Jan. 20, 2022

(65) Prior Publication Data
US 2023/0256679 A1    Aug. 17, 2023

(51) Int. Cl.
*D21J 5/00* (2006.01)
*B29C 64/393* (2017.01)
(Continued)

(52) U.S. Cl.
CPC .............. *D21J 5/00* (2013.01); *B29C 64/393* (2017.08); *B33Y 80/00* (2014.12); *D21F 3/00* (2013.01);
(Continued)

(58) Field of Classification Search
CPC ............. B29C 64/393; D21F 3/00; D21J 5/00
See application file for complete search history.

(56) References Cited

U.S. PATENT DOCUMENTS

| 5,399,243 A | 3/1995 | Miyamoto et al. |
| 5,431,784 A | 7/1995 | Miyamoto et al. |

(Continued)

FOREIGN PATENT DOCUMENTS

| CN | 105777180 A | 7/2016 |
| DE | 9018138 U1 | 2/1996 |

(Continued)

OTHER PUBLICATIONS

Stratasys, "Paper Pulp Molding with FDM Tooling", retrieved at https://www.stratasys.com/siteassets/3dlc/high-school/tag_fdm_paperpulp_en_1015_web.pdf?v=48f5f3, retrieved on May 29, 2020, pp. 11.

*Primary Examiner* — James Sanders
(74) *Attorney, Agent, or Firm* — Michael Dryja

(57) ABSTRACT

According to examples, an apparatus may include a processor that may access information about a screen device having pores, in which the screen device is to be employed to filter liquid from a slurry composed of the liquid and material elements to form a part from the material elements. The processor may also access information about a main body, in which the main body is to support the screen device during formation of the part and has a plurality of openings that are larger than the pores in the screen device. The processor may identify, based on relative locations of the pores and the openings, pores that are to be removed from the screen device to increase uniformity of liquid flow through the pores across the screen device and may modify the accessed information about the screen device to remove the identified pores from the screen device.

15 Claims, 8 Drawing Sheets

(51) Int. Cl.
  *B33Y 80/00* (2015.01)
  *D21F 3/00* (2006.01)
  *B29C 64/153* (2017.01)
  *B33Y 10/00* (2015.01)
  *B33Y 30/00* (2015.01)
  *B33Y 50/02* (2015.01)

(52) U.S. Cl.
  CPC ............ *B29C 64/153* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,795,443 A | 8/1998 | Greve |
| 6,918,997 B2 | 7/2005 | Goto et al. |
| 8,512,861 B2 | 8/2013 | Lockard et al. |
| 9,248,611 B2 | 2/2016 | Divine et al. |
| 10,435,848 B2 | 10/2019 | Andersson et al. |
| 2017/0210069 A1 | 7/2017 | Stubenruss |
| 2019/0005172 A1 | 1/2019 | Riasi et al. |
| 2019/0376239 A1 | 12/2019 | Andersson et al. |
| 2021/0087749 A1 | 3/2021 | Beck |
| 2022/0018071 A1 | 1/2022 | Briden |
| 2023/0106502 A1 | 4/2023 | Briden |

FOREIGN PATENT DOCUMENTS

| | | |
|---|---|---|
| DE | 102018003447 A1 | 10/2019 |
| EP | 0732181 A1 | 9/1996 |
| EP | 4182145 A1 | 5/2023 |
| GB | 2456502 A | 7/2009 |
| JP | 2005-350122 A | 12/2005 |
| JP | 2019-123985 A | 7/2019 |
| KR | 10-2019-0061020 A | 6/2019 |
| RU | 2725390 C2 | 7/2020 |
| WO | 2022/015291 A1 | 1/2022 |

US 12,392,090 B2

1

PORE REMOVAL FROM SCREEN DEVICES TO INCREASE FLOW UNIFORMITY

BACKGROUND

Various types of products may be fabricated from a pulp of material. Particularly, a pulp molding die that includes a main body and a wire mesh may be immersed in the pulp of material and the material in the pulp may form into the shape of the main body and the wire mesh. The main body and the wire mesh may have a desired shape of the product to be formed and may thus have a complex shape in some instances. The main body and the wire mesh may include numerous pores for liquid passage, in which the pores in the wire mesh may be significantly smaller than the pores in the main body. During formation of the product, a vacuum force may be applied through the pulp molding die which may cause the material in the pulp to be sucked onto the wire mesh and form into a shape that matches the shape of the pulp molding die. The material may be removed from the wire mesh and may be solidified to have the desired shape.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable media, in which a processor may identify pores that are to be removed from a screen device, which may be part of a pulp molding die (or equivalently, a mold tool set), to increase uniformity of liquid flow through the pores across the screen device. The processor may also modify information about the screen device to remove the identified pores from the screen device in the modified information. In some examples, the processor may also identify pillars that may form channels between the screen device and a main body (e.g., a mold) that are to be removed or removed. The pillars may be part of the screen device and may thus be removed or moved from the screen device. In any regard, the processor may identify the pillars that are to be removed or moved to further increase uniformity of liquid flow through the pores across the screen device.

Through implementation of the features of the present disclosure, the pores in a 3D fabricated screen device may be designed to enable parts formed on the screen device to be fabricated in an efficient manner. For instance, by increasing (or in some instances, maximizing) uniformity of liquid flow through the pores across the screen device, the uniformity of the rates at which sections of a part may be formed from material elements across the screen device may be increased (or in some instances, maximized). As a result, the part may not have sections that are built up more slowly, which may require that additional time be taken to build up those sections. Instead, the uniform build-up of the sections of the part may enable the part to be formed at an increased efficiency level, e.g., at a minimized length of time, with a minimized amount of material elements, or the like.

Figure 1:
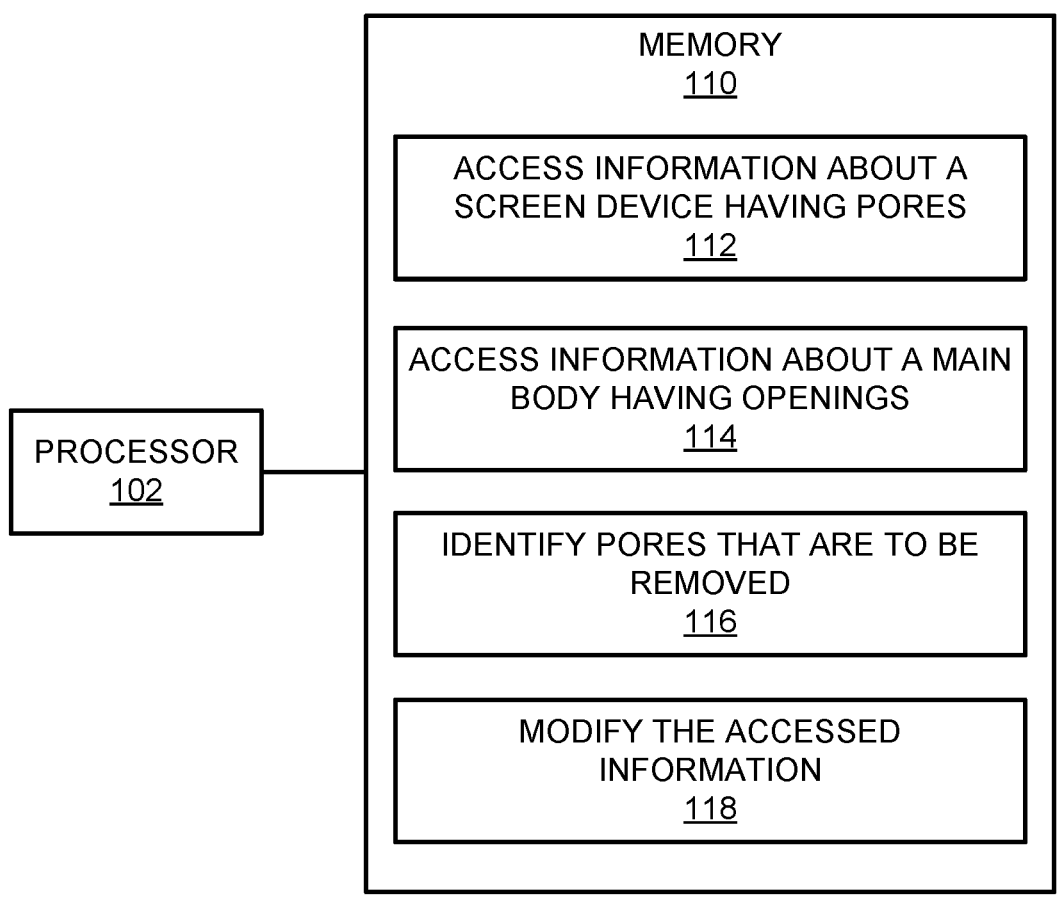
FIG. 1 shows a block diagram of an example apparatus that may identify pores that are to be removed from a screen device to increase uniformity of liquid flow through the pores across the screen device.
Figure 2A:
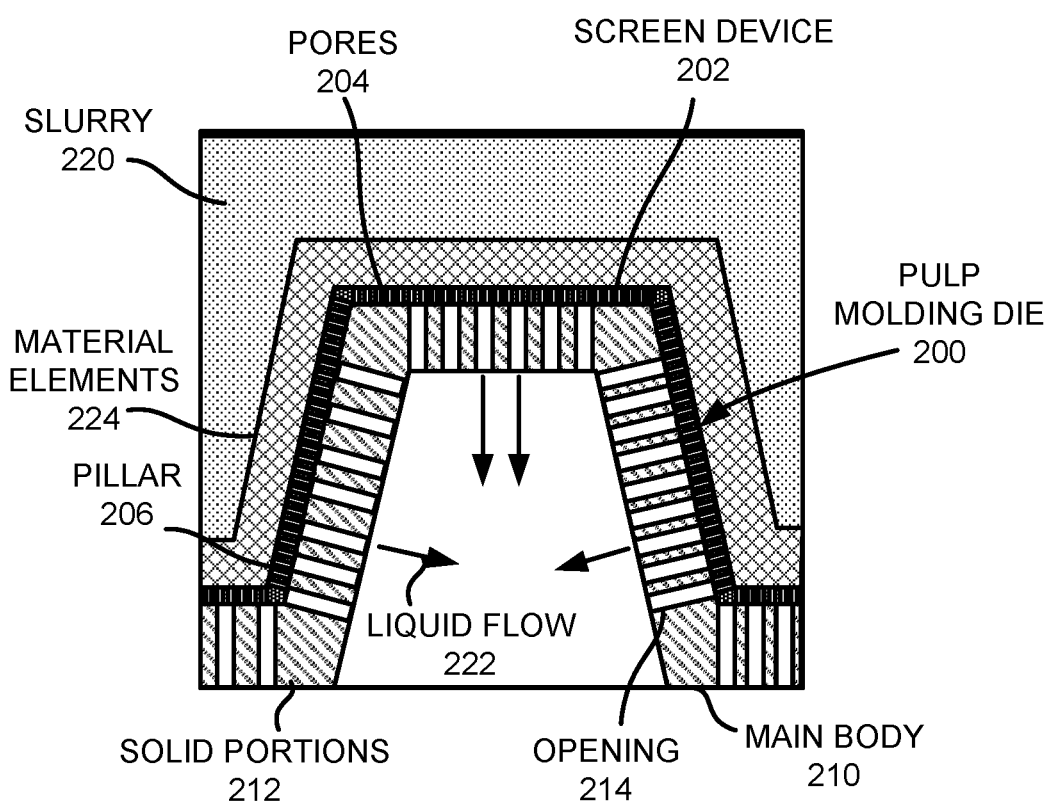
FIG. 2A shows a cross-sectional side view of an example pulp molding die in which the example screen device discussed with respect to FIG. 1 may be implemented.
Figure 2B:
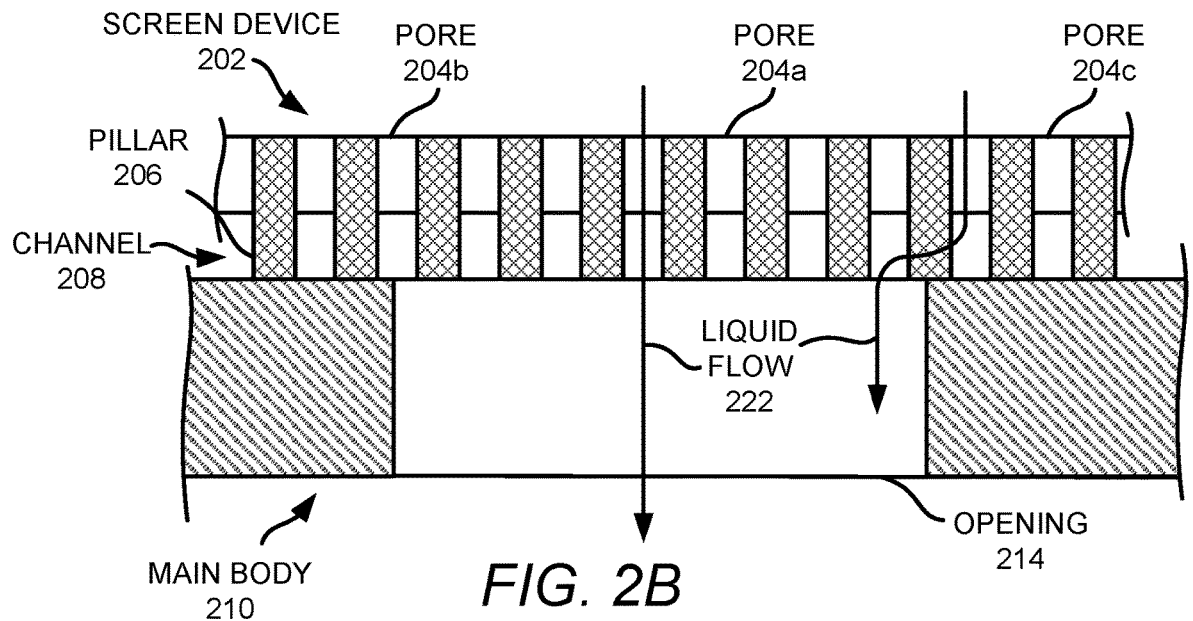
FIG. 2B shows an enlarged view of a section of the pulp molding die shown in FIG. 1.
Figure 2C:
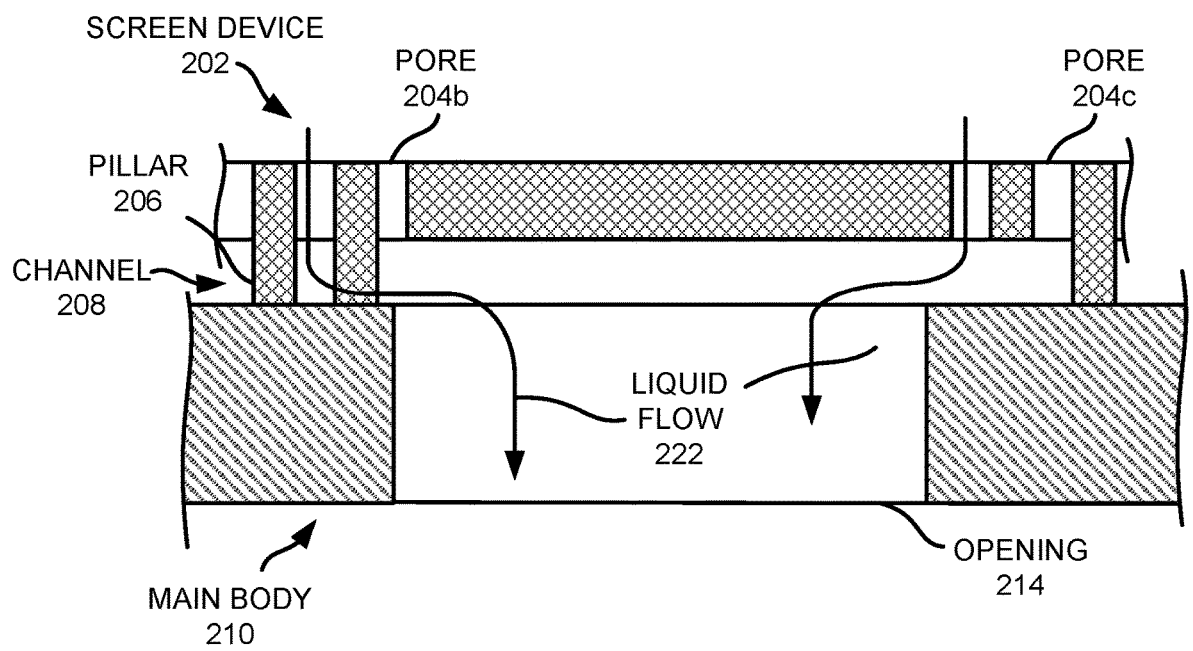
FIG. 2C shows a view similar to FIG. 2B, with some pores and pillars removed.

Reference is first made to FIGS. 1 and 2A-2C. FIG. 1 shows a block diagram of an example apparatus 100 that may identify pores 204 that are to be removed from a screen device 202 to increase uniformity of liquid flow through the pores 204 across the screen device 202. FIG. 2A shows a cross-sectional side view of an example pulp molding die 200 in which the example screen device 202 discussed with respect to FIG. 1 may be implemented. FIG. 2B shows an enlarged view of a section of the pulp molding die 200 shown in FIG. 1 and FIG. 2C shows a view similar to FIG. 2B, with some pores 204 and pillars 206 removed. It should be understood that the example apparatus 100 depicted in FIG. 1 and/or the example pulp molding die 200 depicted in FIGS. 2A-2C may include additional features and that some of the features described herein may be removed and/or modified without departing from the scopes of the apparatus 100 and/or the pulp molding die 200.

The apparatus 100 may be a computing system such as a server, a laptop computer, a tablet computer, a desktop computer, or the like. As shown, the apparatus 100 may include a processor 102, which may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions (which may also be termed computer-readable instructions) that the processor 102 may execute. The memory 110 may be an electronic, magnetic, optical, or other physical storage device that contains or stores executable instructions. The memory 110 may be, for example, Random-Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and multiple memories 110. In addition, or alternatively, the processor 102 and the memory 110 may be integrated into a single component, e.g., an integrated circuit on which both the processor 102 and the memory 110 may be provided.

As shown in FIG. 1, the memory 110 may have stored thereon machine-readable instructions 112-118 that the processor 102 may execute. Although the instructions 112-118 are described herein as being stored on the memory 110 and may thus include a set of machine-readable instructions, the apparatus 100 may include hardware logic blocks that may perform functions similar to the instructions 112-118. For instance, the processor 102 may include hardware components that may execute the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

The processor 102 may execute the instructions 112 to access information about a screen device 202 having pores 204. The processor 102 may access the information via input from a user, from a data store, via a network, and/or the like. The information about the screen device 202 may include information such as the dimensions of the screen device 202, the shape of the screen device 202, the locations of the pores 204 within the screen device 202, the orientations (e.g., the normals) of the pores 204, the material or materials from which the screen device 202 is to be fabricated, and/or the like. In some examples, the information about the screen device 202 may include information that may be used to fabricate the screen device 202 using, for instance, a 3D fabrication system. According to examples, the information about the screen device 202 may be included as comma separated values, in a tabular format, or the like. In addition or alternatively, the information about the screen device 202 may be included as a digital model of the screen device 202.

In the examples discussed herein, the screen device 202 may be employed to filter liquid from a slurry 220 composed of the liquid and material elements 224 to form a part from the material elements 224. The liquid may be water or another type of suitable liquid in which material elements 224, which may be pulp material, e.g., paper, wood, fiber crops, bamboo, or the like, may be mixed into a slurry 220. The material elements 224 may be, for instance, fibers of the pulp material.

In addition to the pores 204, the screen device 202 may include pillars 206 that may extend below the screen device 202 to support the screen device 202 on a main body 210 such that a channel 208 may be formed between the screen device 202 and the main body 210. In other examples, the pillars 206 may be formed on the main body 210 instead of or in addition to the screen device 202.

The processor 102 may execute the instructions 114 to access information about a main body 210 (which may equivalently be referenced as a mold) having openings 214. As shown in FIG. 2A, the openings 214 may be formed between or within a solid portion 212 of the main body 210. The processor 102 may access the information about the main body 210 in any of the manners similar to those discussed above with respect to the information about the screen device 202. According to examples, the information about the main body 210 may be included as comma separated values, in a tabular format, or the like. In addition or alternatively, the information about the main body 210 may be included as a digital model of the main body 210.

As shown in FIG. 2A, the main body 210 may support the screen device 202 during formation of the part. The main body 210 may also be formed to have a relatively larger thickness than the screen device 202 and may be substantially more rigid than the screen device 202. The main body 210 may thus provide structural support for the screen device 202. The solid portions 212 of the main body 210 may be formed of a substantially rigid material, such as a metal, a plastic, a ceramic, and/or the like. In addition, the openings 214 may be formed between or within the solid portions 212 through any suitable fabrication technique. For instance, the openings 214 may be formed through a 3D fabrication process, drilling, through use of a mold, and/or the like. In any of these examples, the openings 214 may extend from one side of the main body 210 to an opposite side of the main body 210. In some examples, the main body 210 and the screen device 202 may be formed together during a 3D fabrication process.

According to examples, and as shown in FIGS. 2A-2C, the openings 214 in the main body 210 may have circular cross-sections that may be relatively larger in diameter than the pores 204 in the screen device 202. In other examples, the openings 214 may have other shapes, such as rectangular, oval, triangular, etc., shapes. In operation, a vacuum pressure may be applied from a side of the main body 210 opposite the screen device 202 when the pulp molding die 200 is immersed in a pulp or slurry 220 containing a material. As liquid in the pulp or slurry 220 flows through the pores 204 in the screen device 202 and the openings 214 in the main body 210 as denoted by the arrows 222, the material elements 224 in the pulp or slurry 220 may be compressed onto the screen device 202 and may take the shape of the screen device 202. Particularly, the material elements 224 may form into a part on the screen device 202 as the liquid is drawn from the slurry 220 and the remaining material elements 224 are dried.

In some examples, as the pores 204 in the screen device 202 may not exactly line up with the openings 214 in the main body 210, the screen device 202 and/or the main body 210 may include channels 208, e.g., formed by the pillars 206, that may enable the flow of liquid between sections of the screen device 202 and the main body 210 that may be in contact with each other. The channels 208 may thus enable pressure to be applied through a larger number of the pores 204 and thus cause liquid to flow through the larger number of the pores 204.

In some instances, liquid may flow more rapidly through the pores 204, e.g., pore 204a, that are positioned within the circumferences of the openings 214 projected from the main body toward the screen device 202 than the pores that are outside of the projected circumferences, e.g., pore 204c. This may occur as there are fewer obstructions between the pore 204a and the opening 214 than there are between the pore 204c and the opening 214. As a result, when vacuum pressure is applied, the material elements 224 may gather more rapidly over the pores 204 that are positioned in-line with the openings 214 than the pores 204 that are not positioned in-line with the openings 214. This difference in the rates at which the material elements 224 gather may result in some sections of the part to reach intended thicknesses more quickly than other sections of the part. This difference in the rates may also cause a relatively long length of time for the sections of the part to be formed above the pores 204 that are not in-line with the openings 214.

As disclosed herein, some of the pores 204 may be removed from the screen device 202 to increase uniformity of liquid flow through the pores 204 across the screen device 202. Through increase of the uniformity of liquid flow through the pores 204, the rates at which the material elements 224 may be collected together across the screen device 202 may be more uniform. As a result, the length of time in forming a part on the screen device 202 having intended thicknesses may be reduced and/or optimized. In this regard, the processor 102 may execute the instructions 116 to identify pores 204 that are to be removed. Particularly, the processor 102 may apply a set of rules to identify which of the pores 204 that are to be removed and which of the pores 204 are to be maintained.

As discussed above, the processor 102 may have accessed information that may include the identification of the locations of the pores 204 in the screen device 202 and the locations of the openings 214 in the main body 210. According to examples, the processor 102 may identify the pores 204 that are to be removed from the screen device 202 based on relative locations of the pores 204 in the screen device 202 with respect to circumferences of the openings 214 projected from the main body 210 toward the screen device 202 when the screen device 202 is positioned on the main body 210, for instance, as shown in FIG. 2A.

By way of a particular non-limiting example, the processor 102 may determine that a pore 204 is to be removed from the screen device 202 based on an entire perimeter of the pore 204 being within the projected circumference of an opening 214 of the main body 210. As shown in FIG. 2B, pore 204a may match this example. As another non-limiting example, the processor 102 may determine that a pore 204 is to be removed from the screen device 202 based on a center of the pore 204 overlapping a portion of the projected circumference of an opening 214 of the main body 210. As shown in FIG. 2B, pore 204b may match this example. As a further non-limiting example, the processor 102 may determine that a pore 204 is to be removed from the screen device 202 based on a center of the pore 204 being outside of the projected circumference of an opening 214 of the main body 210, while a portion of the pore 204 is within the projected circumference of the opening 214. As a yet further non-limiting example, the processor 102 may determine that a pore 204 is to be removed from the screen device 202 based on an entire perimeter of the pore 204 being outside of the projected circumference of an opening 214 of the main body 210. In this example, the processor 102 may determine that the pore 204 is to be removed based on the perimeter of the pore 204 being within a certain distance to the projected circumference of the opening 214.

In other examples, however, the processor 102 may determine that a pore 204 that is not completely within the projected circumference of an opening 214 is not to be removed. In yet other examples, the processor 102 may make pore removal determinations based on other criteria, such as, for instance, a density of pores 204 within a given location, sizes of the pores 204, flow characteristics of liquid through the pores 204, and/or the like. In a particular example, the processor 102 may maintain some of the pores 204 that are positioned entirely within the projected circumference of the opening 214 while removing some or all of the pores 204 that are adjacent to the maintained pores 204.

The processor 102 may determine which of the rules to follow in determining which pores 204 to remove based on any of a number of manners. For instance, the processor 102 may apply a first rule to remove some of the pores 204 and a screen device 202 with the removed pores 204 may be fabricated. A test may be performed on the screen device 202 to determine the flow properties of the liquid through screen device 202. This process may be repeated for a number of different pore removal configurations to determine the pore removal configuration that may result in the highest level of liquid flow uniformity across the screen device 202. In some examples, the tests may be performed empirically on fabricated screen devices 202, while in other examples, the tests may be performed through use of modeling techniques, such as through implementation of computational fluid dynamics modeling.

In some examples, the processor 102 may determine whether removal of a pore 204 from the screen device 202 causes a shortest distance between nearest neighboring pores 204 of the removed pore 204 to exceed a predefined distance threshold. In some instances in which the gap between pores 204 is relatively large, the lack of liquid flow at an area of the gap on the screen device 202 may result in material elements 224 failing to collect on the area. As a result, a thinner section of material elements 224 may form on the area, and may thus require a greater length of time for the material elements 224 to form into the part.

In order to prevent the thinner sections from forming on the screen device 202, the processor 102 may determine whether removal of the pore 204 may cause a gap in the pores 204 that may be sufficiently large to cause an area of smaller thickness material elements 224 to form on the screen device 202. The predefined distance threshold may be based upon, for instance, sizes of the material elements 224, the concentration of material elements 224 in the slurry 220, the amount of vacuum pressure applied through the screen device 202, and/or the like. In addition, the predefined distance threshold may be determined through physical testing, modeling, and/or the like.

In any regard, based on a determination that removal of the pore 204 causes a shortest distance between nearest neighboring pores 204 of the removed pore 204 to exceed the predefined distance threshold, the processor 102 may maintain the pore 204 in the screen device 202.

According to examples, the processor 102 may access information about the pillars 206 that may provide a channel 208 between the screen device 202 and the main body 210. The processor 102 may access the information about the pillars 206 from the information about the screen device 202. That is, for instance, the pillars 206 may be part of the screen device 202 and the information about the screen device 202 may include information about the pillars 206. In other examples, the pillars 206 may be part of the main body 210 and the information about the main body 210 may include information about the pillars 206. In yet other examples, the information about the pillars 206 may be separate from both the information about the screen device 202 and the main body 210.

In any regard, the processor 102 may identify, from the accessed information about the pillars 206, pillars 206 that are to be removed or moved from their stated locations. The identification of which pillars 206 to remove or move may be made to increase uniformity of liquid flow 222 through the pores 204 across the screen device 202. That is, some of the pillars 206 may be positioned at locations at which the pillars 206 may restrict the flow of the liquid in the channel 208 as compared with other locations and removal of those pillars 206 may increase the liquid flow 222 at those locations. Additionally or alternatively, the channel 208 may include locations where the liquid flow 222 is higher than other locations and movement of the pillars 206 from the lower flow locations to the higher flow locations may result in the flow at the locations being more uniform with respect to each other. A result of the more uniform liquid flow 222 through the locations of the channel 208 may be that liquid flow 222 through the pores 204 near those locations may also be more uniform.

The processor 102 may determine which of the pillars 206 to remove or move through implementation of empirical testing and/or computer modeling. For instance, liquid flow 222 characteristics through the channel 208 resulting from removal or movement of some of the pillars 206 may be determined and a determination may be made as to the uniformity of liquid flow 222 through the pores 204 across the screen device 202. Additional liquid flow 222 characteristics through the channel 208 resulting from the removal or movement of others of the pillars 206 may be determined and determinations may be made as to the uniformity of liquid flow 222 through the pores 204 across the screen device 202. Moreover, a determination may be made as to which removal and/or movement of the pillars 206 resulted in the greatest increase in the uniformity of liquid flow 222 through the pores 204 across the screen device 202. The processor 102 may remove and/or move those pillars 206.

By way of particular non-limiting example, the processor 102 may remove all of the pillars 206 that extend directly above an opening 214. In addition, or alternatively, the processor 102 may remove a certain number of the pillars 206 and may arrange the remaining pillars 206 to be equidistant from each other.

According to examples, the processor 102 may determine whether removal or movement of a pillar 206 causes a shortest distance between nearest neighboring pillars 206 of the removed or moved pillar 206 to exceed a predefined span threshold. In some instances in which the span of the screen device 202 between pores 204 is relatively large, the screen device 202 may be bowed toward the main body 210 at the span, which may restrict liquid flow 222 at that section. This may result in a greater deviation in liquid flow at that section as compared with other locations in the channel 208.

In order to prevent spans of the screen device 202 between the pillars 206 from bowing to an extent that may affect liquid flow 222 through the channel 208, the processor 102 may determine whether removal or movement of the pillar 206 may cause a span to be sufficiently large to cause the span to bow beyond some predefined level. The predefined span threshold may be based upon, for instance, the thickness of the screen device 202, the material or materials from which the screen device 202 is fabricated, the amount of vacuum pressure applied through the screen device 202, and/or the like. In addition, the predefined span threshold may be determined through physical testing, modeling, and/or the like.

In any regard, based on a determination that removal or movement of the pillar 206 causes a shortest distance between nearest neighboring pillars 206 of the removed or moved pillar 206 to exceed the predefined span threshold, the processor 102 may maintain the pillar 206.

According to examples, the processor 102 may identify the pores 204 to be removed and the pillars 206 to be removed or moved concurrently with each other. That is, for instance, the processor 102 may identify combinations of pores 204 and the pillars 206 that may be removed to increase (and/or maximize) uniformity of liquid flow 222 through the pores 204 across the screen device 202. The processor 102 may identify the combination of pores 204 and pillars 206 to remove through empirical testing and/or modeling of different combinations of pore 204 and pillar 206 removals.

The processor 102 may execute the instructions 118 to modify the accessed information about the screen device 202 to remove the identified pores 204 from the screen device 202. For instance, the processor 102 may modify or update the information about the screen device 202 to remove the identified pores 204 identified in the accessed information. As such, when the screen device 202 is fabricated using the information about the screen device 202, the removed pores 204 may not be formed in the screen device 202. In examples in which the information about the screen device 202 is included as comma separated values, the processor 102 may delete the entries corresponding to the removed pores 204 from the comma separated values.

The processor 102 may also modify the accessed information about the pillars 206 to remove or move the identified pillars 206. For instance, the processor 102 may modify or update the information about the pillars 206 to remove or move the pillars 206 identified in the accessed information. As such, when the screen device 202 is fabricated using the information about the screen device 202, the removed pillars 206 may not be formed in the screen device 202 and the moved pillars 206 may be formed at the moved positions on the screen device 202. In examples in which the information about the pillars 206 is included as comma separated values, the processor 102 may delete the entries corresponding to the removed pillars 206 from the comma separated values and may add entries corresponding to the moved pillars 206 in the comma separated values.

An example of the screen device 202 with some of the pores 204 and some of the pillars 206 removed is depicted in FIG. 2C. As shown in FIG. 2C, the liquid flow 222 may differ from the liquid flow 222 depicted in FIG. 2B. Particularly, for instance, the liquid flow 222 through the pores 204 in FIG. 2C may be more uniform across the screen device 202.

Figure 3:
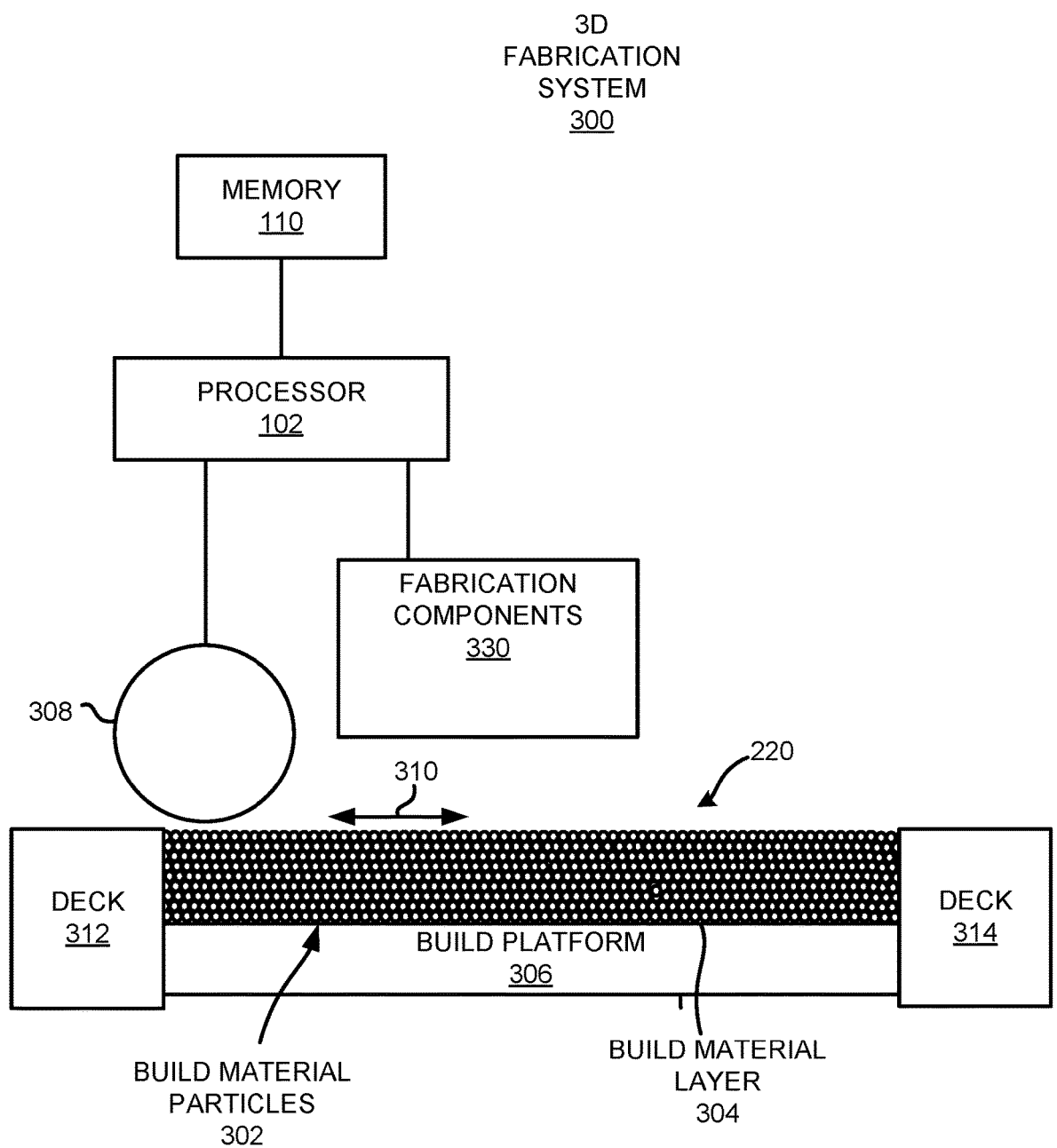
FIG. 3 shows an example 3D fabrication system that may be employed to fabricate the screen device depicted in FIGS. 2A-2C.

According to examples, the processor 102 may cause a three-dimensional (3D) fabrication system to fabricate the screen device 202 according to the information about the screen device 202. In some examples, the processor 102 may also cause the 3D fabrication system 300 to fabricate the main body 210 to have openings 214 according to the information about the main body 210. An example of a suitable 3D fabrication system 300 that may be employed to fabricate the screen device 202, and in some examples, the main body 210, is depicted in FIG. 3. It should be understood that the example 3D fabrication system 300 depicted in FIG. 3 may include additional features and that some of the features described herein may be removed and/or modified without departing from the scope of the 3D fabrication system 300.

The build material particles 302 may be formed into a build material layer 304 on a build platform 306 during fabrication of the screen device 202, and in some examples, the main body 210. The build material particles 302 may include any suitable material for use in forming 3D objects, for instance, a polymer, a plastic, a ceramic, a nylon, a metal, combinations thereof, or the like, and may be in the form of a powder or a powder-like material. As shown, the 3D fabrication system 300 may include a recoater 308, which may spread, spray, or otherwise form the build material particles 302 into a build material layer 304 as the recoater 308 is moved across the build platform 306 as indicated by the arrow 310. According to examples, the build platform 306 may provide a build area for the build material particles 302 to be spread into successive layers 304 of build material particles 302. The build platform 306 may be movable in a direction away from the recoater 308 during formation of successive build material layers 304.

According to examples, the 3D fabrication system 300 may include decks 312, 314 from which build material particles 302 may be supplied for formation into build material layers 304. For instance, the deck 312 may supply an amount of build material particles 302 on top of the deck 312 that the recoater 308 may push over the build platform 306 as the recoater 308 is moved across the build platform 306 as denoted by the arrow 310 to form a build material layer 304 on the build platform 306 or on a previously formed build material layer 304.

As shown, the processor 102 may control operations of the recoater 308. In other examples, however, the 3D fabrication system 300 may include a separate controller (not shown) that may control operations of the recoater 308 in which the processor 102 may communicate with the controller. The processor 102 and/or the controller 320 may control other components of the 3D fabrication system 300. For instance, the 3D fabrication system 300 may include fabrication components 330 and the memory 110 may have instructions that the processor 102 or controller may execute to control the fabrication components 330. Particularly, the processor 102 or controller may control the fabrication components 330 to cause the build material particles 302 at selected locations of the build material layer 304 to be bound and/or fused together to form the pillars 206 of the screen device 202 in the build material layer 304.

The fabrication components 330 may include an agent delivery device that the processor 102 may control to selectively deliver an agent onto the build material layer 304. For instance, the processor 102 may control the agent delivery device to deliver a fusing agent onto the selected locations of the build material layer 304 that are to be bound/fused together to form the pillars 206. By way of particular example, the agent delivery device may be a printhead having a plurality of nozzles in which droplet ejectors, e.g., resistors, piezoelectric actuators, and/or the like, may be provided to eject droplets of an agent through the nozzles.

According to examples, the agent may be a fusing and/or a binding agent to selectively bind and/or solidify the build material particles 302 on which the agent has been deposited. In particular examples, the agent may be a chemical binder, a thermally curable binder, and/or the like. In other particular examples, the agent may be a fusing agent that may increase the absorption of energy to selectively fuse the build material particles 302 upon which the agent has been deposited. The fabrication components 330 may also include another agent delivery device that the processor 102 may control to selectively deliver another type of agent onto the build material layer 304. The other type of agent may be a detailing agent, which may inhibit or prevent fusing of build material particles 302 upon which the detailing agent has been deposited, for example by modifying the effect of a fusing agent.

The fabrication components 330 may also include an energy source that may apply energy, e.g., warming energy, onto the build material layer 304, for instance, to warm the build material particles 302 in the build material layer 304 to an intended temperature. The energy source may output energy, e.g., in the form of light and/or heat and may be supported on a carriage, which may be movable across the build platform 306. As such, for instance, the energy source may output energy onto the build material layer 304 as the carriage is moved across the build platform 306 to cause the build material particles 302 upon which the fusing agent has been deposited to melt and subsequently fuse together. In other examples, the screen device 202 may be formed through implementation of another fabrication technique. For instance, the screen device 202 may be formed through selective laser ablation, selective laser melting, stereolithography, fused deposition modeling, and/or the like.

Figure 4:
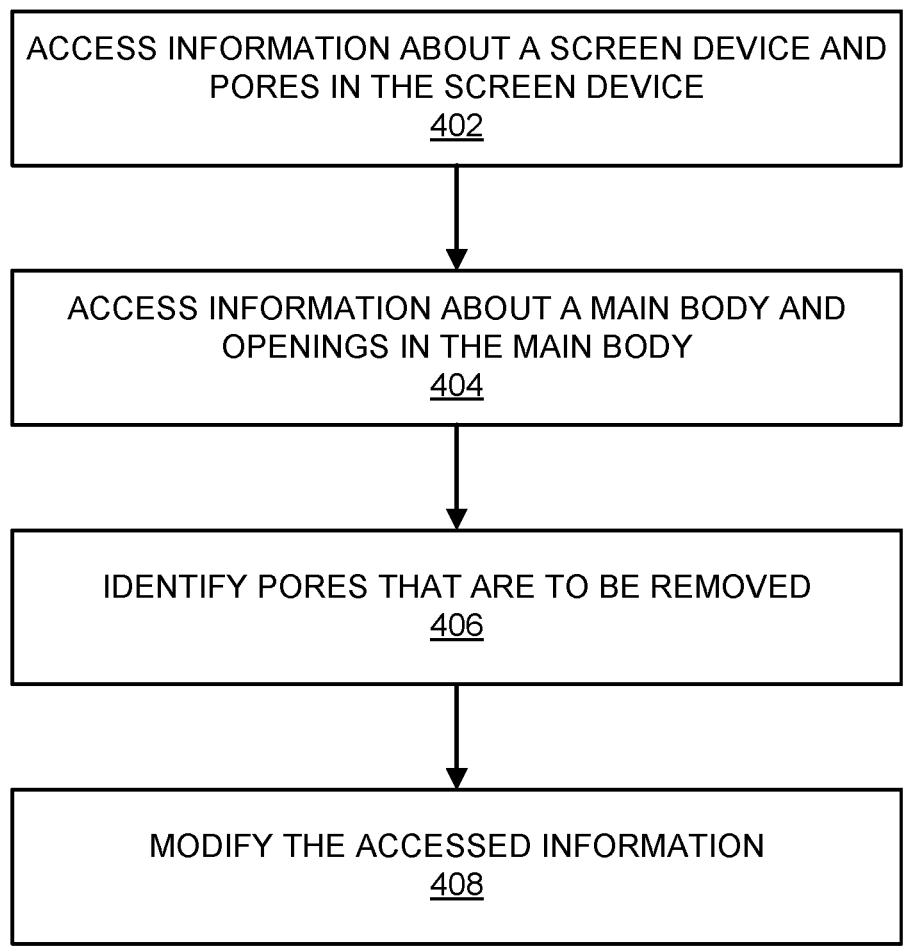
FIGS. 4 and 5A-5B, respectively, show flow diagrams of example methods for identifying pores that are to be removed from a screen device to increase uniformity of liquid flow through the pores across the screen device.
Figure 5A:
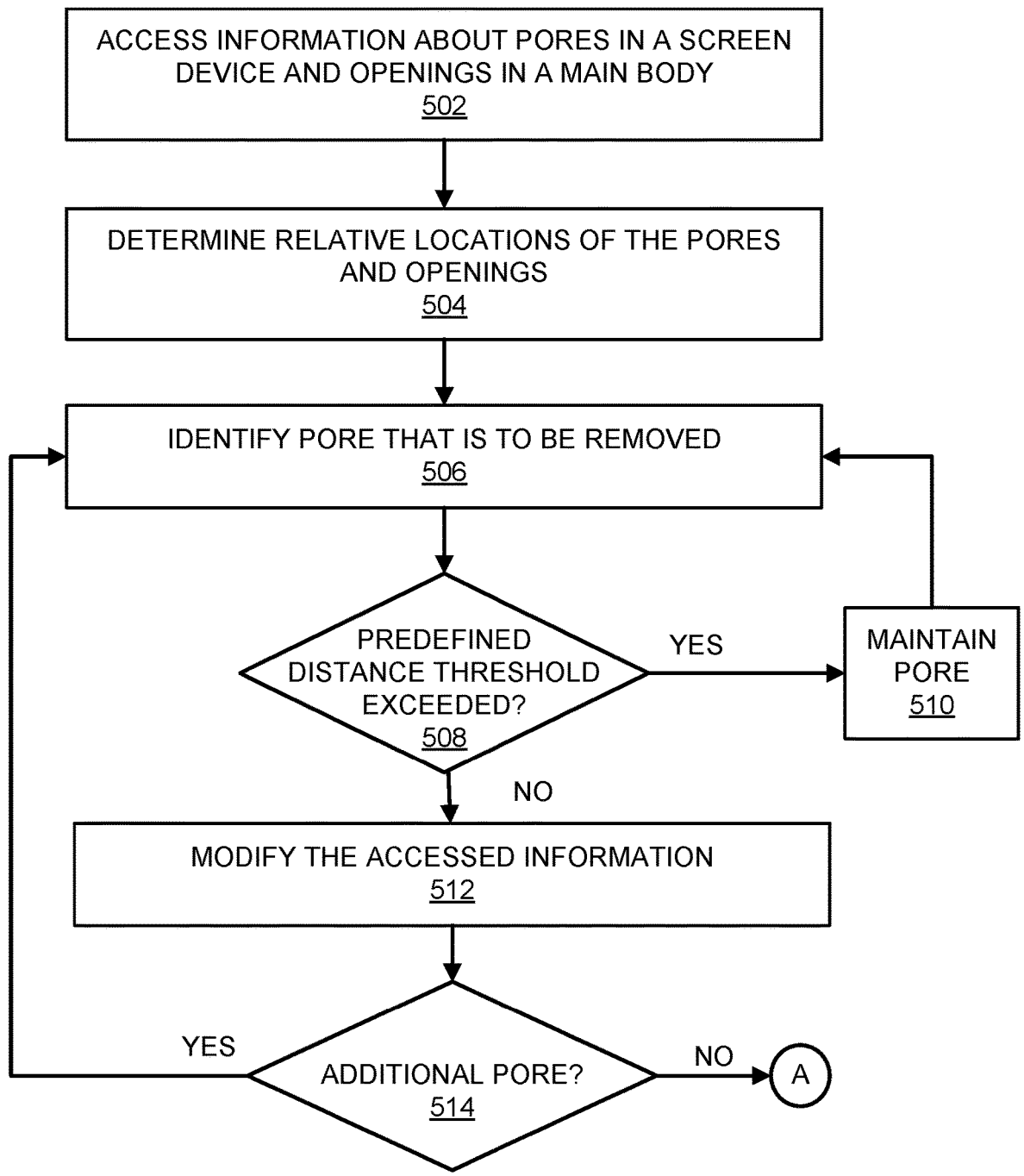
Figure 5B:
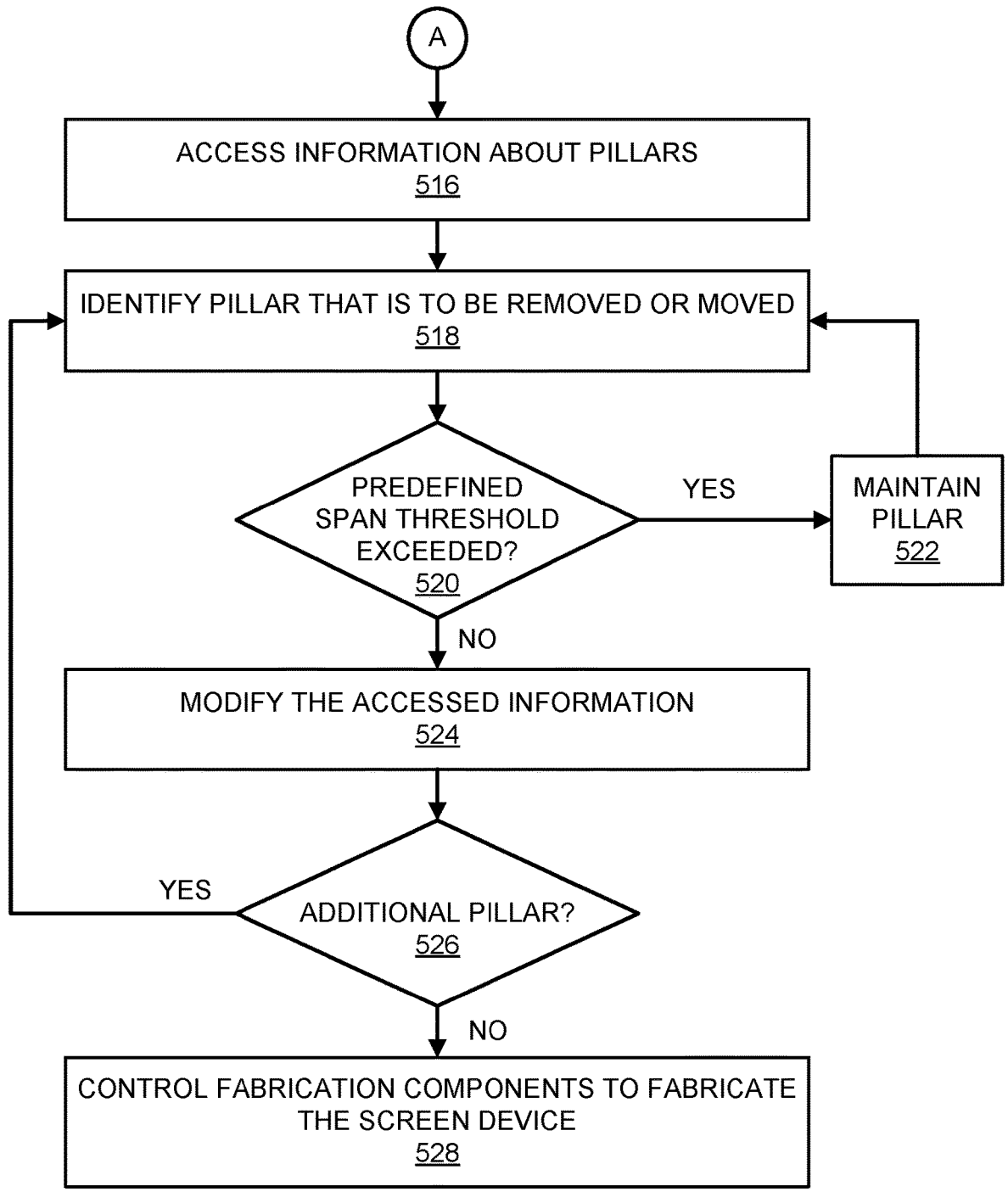

Reference is now made to FIGS. 4 and 5A-5B, which respectively depict flow diagrams of example methods 400, 500 for identifying pores 204 that are to be removed from a screen device 202 to increase uniformity of liquid flow through the pores 204 across the screen device 202. It should be understood that the methods 400, 500 depicted in FIGS. 4 and 5A-5B may include additional operations and that some of the operations described therein may be removed and/or modified without departing from the scopes of the methods 400, 500. The descriptions of the methods 400, 500 are also made with reference to the features depicted in FIGS. 1-3 for purposes of illustration. Particularly, the processor 102 may execute some or all of the operations included in the methods 400, 500.

At block 402, the processor 102 may access information about a screen device 202 having attributes that are to form matching attributes on a part, in which the part is to be formed from a slurry 220 composed of a liquid and material elements 224. As discussed herein, the information about the screen device 202 may include information about pores 204 in the screen device 202. At block 404, the processor 102 may access information about a main body 210 having openings 214 that are larger than the pores 204 in the screen device 202, in which the main body 210 is to support the screen device 202 during formation of the part. The information about the main body 210 may include about the openings 214.

At block 406, the processor 102 may identify, based on the accessed information about the screen device 202 and the main body 210, pores 204 in the screen device 202 that are to be removed to increase uniformity of liquid flow 222 through the pores 204 across the screen device 202. In addition, at block 408, the processor 102 may modify the accessed information about the screen device 202 to remove the identified pores 204 from the screen device 202.

Turning now to FIGS. 5A and 5B, at block 502, the processor 102 may access information about pores 204 in a screen device 202 and openings 214 in a main body 210. At block 504, the processor 102 may determine relative locations of the pores 204 and the openings 214. At block 506, the processor 102 may identify a pore 204 that is to be removed from the screen device 202, for instance, based on the relative locations of the pores 204 with respect to circumferences of the openings projected from the main body 210 toward the screen device 202 when the screen device 202 is positioned on the main body 210.

At block 508, the processor 102 may determine whether removal of a pore 204 from the screen device 202 causes a shortest distance between nearest neighboring pores 204 of the removed pore 204 to exceed a predefined distance threshold. Based on a determination that removal of the pore 204 causes a shortest distance between nearest neighboring pores 204 of the removed pore 204 to exceed the predefined distance threshold, at block 510, the processor 102 may maintain the pore 204 in the screen device 202. In addition, the processor 102 may identify another pore 204 that is to be removed at block 506 and may repeat blocks 508-510.

However, at block 508, based on a determination that removal of the pore 204 does not cause a shortest distance between nearest neighboring pores 204 of the removed pore 204 to exceed the predefined distance threshold, at block 512, the processor 102 may modify the accessed information about the pores 204 in the screen device 202 to remove the pore 204. In addition, at block 514, the processor 102 may determine whether there is an additional pore 204 that is to be considered for removal. Based on a determination that there is an additional pore 204 that is to be removed, the processor 102 may identify the pore 204 at block 506 and may repeat blocks 506-514 until the processor 102 determines that there are no additional pores 204 for consideration for removal.

Based, however, on a determination that there are no additional pores 204 for consideration for removal at block 514, at block 516 (FIG. 5B) the processor 102 may access information about pillars 206 that are to provide a channel 208 between the screen device 202 and the main body 210. At block 518, the processor 102 may identify, from the accessed information about the pillars 206, a pillar 206 that is to be removed or moved to increase uniformity of liquid flow through the pores 204 across the screen device 202. At block 520, the processor may determine whether removal or movement of a pillar 206 causes a shortest distance between nearest neighboring pillars 206 of the removed or moved pillar 206 to exceed a predefined span threshold. Based on a determination that removal of the pillar 206 causes a shortest distance between nearest neighboring pillars 206 of the removed or moved pillar 206 to exceed the predefined span threshold, at block 522, the processor 102 may maintain the pillar 206.

However, based on a determination that removal of the pillar 206 does not cause the shortest distance between nearest neighboring pillars 206 of the removed or moved pillar 206 to exceed the predefined span threshold, at block 524, the processor 102 may modify the accessed information about the pillars 206 to remove or move the pillars 206 identified to be removed or moved. In addition, at block 526, the processor 102 may determine whether there is an additional pillar 206 that is to be considered for removal or movement. Based on a determination that there is an additional pillar 206 that is to be removed or moved, the processor 102 may identify the pillar 206 at block 518 and may repeat blocks 518-526 until the processor 102 determines that there are no additional pillars 206 for consideration for removal.

Based on a determination that there are no additional pillars 206 that are to be removed or moved, the processor 102 may end the method 500. In some examples, however, at block 528, the processor 102 may control fabrication components 330 to fabricate the screen device 202 with the removed pores 204 and the removed and/or moved pillars 206.

According to examples, instead of separately identifying and removing the pores 204 and the pillars 206, the processor 102 may identify and remove pores 204 and pillars 206 concurrently with each other.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms. For example, the methods 400 and 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
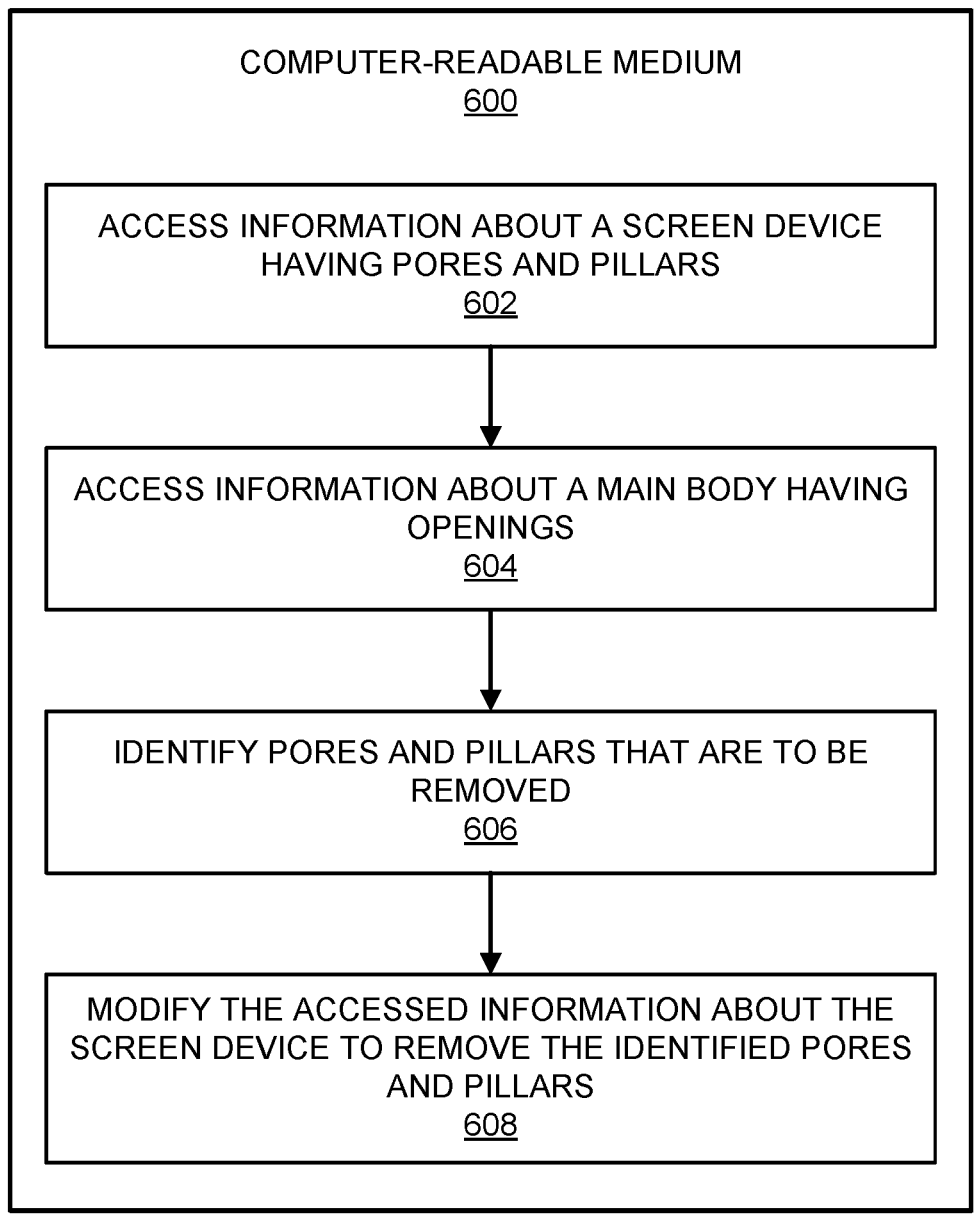
FIG. 6 shows a block diagram of a computer-readable medium that may have stored thereon computer-readable instructions for identifying pores and pillars that are to be removed from a screen device to increase uniformity of liquid flow through the pores across the screen device.

Turning now to FIG. 6, there is shown a block diagram of a computer-readable medium 600 that may have stored thereon computer-readable instructions for identifying pores 204 and pillars 206 that are to be removed from a screen device 202 to increase uniformity of liquid flow through the pores 204 across the screen device 202. It should be understood that the computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 may have stored thereon machine-readable instructions 602-608 that a processor, such as the processor 102 depicted in FIG. 1, may execute. The computer-readable medium 600 may be an electronic, magnetic, optical, or other physical storage device that contains or stores executable instructions. The computer-readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to access information about a screen device 202 having pores 204 and pillars 206, in which the screen device 202 is to be employed to filter liquid from a slurry 220 composed of the liquid and material elements 224 to form a part from the material elements 224. The processor may fetch, decode, and execute the instructions 604 to access information about a main body 210, in which the main body 210 is to support the screen device 202 during formation of the part. The main body 210 may have a plurality of openings 214 that are larger than the pores 204 in the screen device 202. The processor may fetch, decode, and execute the instructions 606 to identify, based on relative locations of the pores 204 and the openings 214, pores 204 and pillars 206 that are to be removed from the screen device 202 to increase uniformity of liquid flow 222 through the pores 204 across the screen device 202. In addition, the processor may fetch, decode, and execute the instructions 608 to modify the accessed information about the screen device 202 to remove the identified pores 204 and pillars 206 from the screen device 202.

The processor may also fetch, decode, and execute instructions to determine whether removal of a pore 204 from the screen device 202 causes a shortest distance between nearest neighboring pores 204 of the removed pore 204 to exceed a predefined distance threshold and, based on a determination that removal of the pore 204 causes a shortest distance between nearest neighboring pores 204 of the removed pore 204 to exceed the predefined distance threshold, maintain the pore 204 in the screen device 202. The processor may further fetch, decode, and execute instructions to determine whether removal of a pillar 206 causes a shortest distance between nearest neighboring pillars 106 of the removed pillar 106 to exceed a predefined span threshold and based on a determination that removal of the pillar 206 causes a shortest distance between nearest neighboring pillars 206 of the removed pillar 206 to exceed the predefined span threshold, maintain the pillar 206.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
   a processor; and
   a memory on which is stored instructions that when executed by the processor, cause the processor to:
   access information about a screen device having pores, wherein the screen device is to be employed to filter liquid from a slurry composed of the liquid and material elements to form a part from the material elements;
   access information about a main body, wherein the main body is to support the screen device during formation of the part and has a plurality of openings that are larger than the pores in the screen device;
   identify, based on relative locations of the pores and the openings, pores that are to be removed from the screen device to increase uniformity of liquid flow through the pores across the screen device;
   modify the accessed information about the screen device to remove the identified pores from the screen device in the modified information; and
   ultimately cause a 3D fabrication system to fabricate the screen device in accordance with the modified information.

2. The apparatus of claim 1, wherein the instructions cause the processor to:
   identify the pores that are to be removed from the screen device based on relative locations of the pores in the screen device with respect to circumferences of the openings projected from the main body toward the screen device when the screen device is positioned on the main body.

3. The apparatus of claim 2, wherein the instructions cause the processor to:
   determine that a pore is to be removed from the screen device based on:
   an entire perimeter of the pore being within the projected circumference of an opening of the main body;
   a center of the pore overlapping a portion of the projected circumference of an opening of the main body; and/or
   a center of the pore being outside of the projected circumference of an opening of the main body while portion of the pore is within the projected circumference of the opening.

4. The apparatus of claim 2, wherein the instructions cause the processor to:
   maintain pores that are positioned entirely within the projected circumferences of the opening while removing pores that are adjacent to the maintained pores.

5. The apparatus of claim 2, wherein the instructions cause the processor to:
   determine whether removal of a pore from the screen device causes a shortest distance between nearest neighboring pores of the removed pore to exceed a predefined distance threshold; and
   based on a determination that removal of the pore causes a shortest distance between nearest neighboring pores of the removed pore to exceed the predefined distance threshold, maintain the pore in the screen device.

6. The apparatus of claim 1, wherein the instructions cause the processor to:
   access information about pillars that are to provide a channel between the screen device and the main body;
   identify, from the accessed information about the pillars, pillars that are to be removed or moved to increase uniformity of liquid flow through the pores across the screen device; and
   modify the accessed information about the pillars to remove or move the pillars identified to be removed or moved.

7. The apparatus of claim 6, wherein the instructions cause the processor to:
   determine whether removal or movement of a pillar causes a shortest distance between nearest neighboring pillars of the removed or moved pillar to exceed a predefined span threshold; and
   based on a determination that removal or movement of the pillar causes a shortest distance between nearest neighboring pillars of the removed or moved pillar to exceed the predefined span threshold, maintain the pillar.

8. A method comprising:
   accessing, by a processor, information about a screen device having attributes that are to form matching attributes on a part, wherein the part is to be formed from a slurry composed of a liquid and material elements, the information about the screen device including information about pores in the screen device;
   accessing, by the processor, information about a main body having openings that are larger than the pores in the screen device, wherein the main body is to support the screen device during formation of the part;
   identifying, by the processor and based on the accessed information about the screen device and the main body, pores in the screen device that are to be removed to increase uniformity of liquid flow through the pores across the screen device;
   modifying, by the processor, the accessed information about the screen device to remove the identified pores from the screen device; and
   fabricating, by a 3D fabrication system, the screen device in accordance with the modified information.

9. The method of claim 8, further comprising identifying the pores that are to be removed from the screen device based on relative locations of the pores in the screen device with respect to circumferences of the openings projected from the main body toward the screen device when the screen device is positioned on the main body.

10. The method of claim 8, further comprising:
    determining whether removal of a pore from the screen device causes a shortest distance between nearest neighboring pores of the removed pore to exceed a predefined distance threshold; and
    based on a determination that removal of the pore causes a shortest distance between nearest neighboring pores of the removed pore to exceed the predefined distance threshold, maintaining the pore in the screen device.

11. The method of claim 8, further comprising:
    accessing information about pillars that are to provide a channel between the screen device and the main body;
    identifying, from the accessed information about the pillars, pillars that are to be removed or moved to increase uniformity of liquid flow through the pores across the screen device; and
    modifying the accessed information about the pillars to remove or move the pillars identified to be removed or moved.

12. The method of claim 11, further comprising:
    determining whether removal or movement of a pillar causes a shortest distance between nearest neighboring pillars of the removed or moved pillar to exceed a predefined span threshold; and
    based on a determination that removal of the pillar causes a shortest distance between nearest neighboring pillars of the removed or moved pillar to exceed the predefined span threshold, maintaining the pillar.

13. A non-transitory computer-readable medium on which is stored computer-readable instructions that when executed by a processor, cause the processor to:
    access information about a screen device having pores and pillars, wherein the screen device is to be employed to filter liquid from a slurry composed of the liquid and material elements to form a part from the material elements;
    access information about a main body, wherein the main body is to support the screen device during formation of the part and has a plurality of openings that are larger than the pores in the screen device;
    identify, based on relative locations of the pores and the openings, pores and pillars that are to be removed from the screen device to increase uniformity of liquid flow through the pores across the screen device;
    modify the accessed information about the screen device to remove the identified pores and pillars from the screen device; and
    ultimately cause a 3D fabrication system to fabricate the screen device in accordance with the modified information.

14. The non-transitory computer-readable medium of claim 13, wherein the instructions cause the processor to:
    determine whether removal of a pore from the screen device causes a shortest distance between nearest neighboring pores of the removed pore to exceed a predefined distance threshold; and
    based on a determination that removal of the pore causes a shortest distance between nearest neighboring pores of the removed pore to exceed the predefined distance threshold, maintain the pore in the screen device.

15. The non-transitory computer-readable medium of claim 13, wherein the instructions cause the processor to:
    determine whether removal of a pillar causes a shortest distance between nearest neighboring pillars of the removed pillar to exceed a predefined span threshold; and
    based on a determination that removal of the pillar causes a shortest distance between nearest neighboring pillars of the removed pillar to exceed the predefined span threshold, maintain the pillar.

* * * * *